(12) United States Patent
Rutter

(10) Patent No.: US 7,743,784 B2
(45) Date of Patent: Jun. 29, 2010

(54) BURSTING DISC ASSEMBLY

(75) Inventor: Benjamin Rutter, Whitley Bay (GB)

(73) Assignee: Eco Rupture Disc Limited, Buckinghamshire (GB)

( * ) Notice: Subject to any disclaimer, the term of this patent is extended or adjusted under 35 U.S.C. 154(b) by 288 days.

(21) Appl. No.: 11/843,348

(22) Filed: Aug. 22, 2007

(65) Prior Publication Data
US 2008/0053527 A1  Mar. 6, 2008

(30) Foreign Application Priority Data
Aug. 24, 2006 (GB) ................................ 0616820.7

(51) Int. Cl.
*F16K 17/16* (2006.01)
(52) U.S. Cl. ................. 137/68.28; 137/68.23
(58) Field of Classification Search .............. 137/68.23, 137/68.25, 68.21, 68.28
See application file for complete search history.

(56) References Cited

U.S. PATENT DOCUMENTS 2,954,897 A * 10/1960 Hansen et al. ............. 220/89.2
3,881,629 A * 5/1975 Shaw et al. ................ 220/89.2
4,352,365 A   10/1982 Boccardo et al.
4,580,589 A    4/1986 Le Bras et al.
4,759,460 A    7/1988 Mozley
5,979,477 A * 11/1999 Stillings ........................ 137/1
6,604,521 B2   8/2003 Smith
2004/0003842 A1 1/2004 DeCourcy et al.

FOREIGN PATENT DOCUMENTS

| EP | A-0395318 | 10/1990 |
| GB | 1545567 | 5/1979 |
| GB | A-2316450 | 2/1998 |
| WO | WO 03/059453 | 7/2003 |
| WO | WO-2005/054731 | 6/2005 |

\* cited by examiner

*Primary Examiner*—John Rivell
*Assistant Examiner*—Macade Brown
(74) *Attorney, Agent, or Firm*—Stites & Harbison PLLC; Ross F. Hunt, Jr.; Douglas E. Jackson

(57) ABSTRACT

A bursting disc assembly has a bursting disc and an outlet side support ring. In order to provide a safety warning, when the bursting disc assembly is incorrectly installed in a reversed orientation, the outlet side ring has a passage through it from its radial interior to its exterior, in the form of a full thickness slot or a groove. In an incorrect installation, this passage provides a leak path from the pressurized side of the disc.

15 Claims, 4 Drawing Sheets

BURSTING DISC ASSEMBLY

TECHNICAL FIELD

This invention relates to safety pressure devices and, more particularly to the devices known as bursting discs, which are designed to rupture reliably at predetermined pressure differentials. Typically a bursting disc is mounted in a pipe connected to a vessel which is subjected to internal pressure in use.

BACKGROUND

Bursting discs are designed to be supported in a very controlled manner in order to achieve burst pressure accuracy and repeatability. Bursting disc manufacturers provide holders to suit their particular design of bursting disc. Performance features of bursting discs often depend on the holder and disc operating together sympathetically. A typical example is by using keyed tabs on the disc and suitable location cut outs in the holder to receive the tabs so that the disc can only be inserted in the correct orientation, in order to enforce flow direction between the disc and the holder.

Various mechanisms have been used in attempts to eliminate the holder and reduce costs. Typically, this may only be achieved with customers who are able to modify the disc location interface to accept the control features that would have been used on the holder, for example controlled bore diameter and disc seat geometry. This is impractical except for customers who may be classed as OEM (Original Equipment Manufacturers) when incorporating these design changes into the disc mating parts is possible.

In the process industries, bursting disc assemblies, typically mounted in holders, are installed between flanges with flat gasket seals. It is desirable to eliminate the use of a holder in order to reduce costs. However, the opportunity to modify the flanges to suit the particular requirements of the bursting disc is absent in most process industries because pipe networks utilise standard components such as "off the shelf" flanges and gaskets. It has therefore long been thought that eliminating holders in the process industry is impracticable.

SUMMARY OF THE INVENTION

This invention aims to provide a bursting disc assembly capable of use without a holder, to be mounted directly between plain, standard flanges. As previously mentioned, one of the key features of a bursting disc holder is to ensure correct disc orientation. This invention provides a low-cost counter-measure to the serious potential fault of incorrect disc orientation.

According to the present invention, there is provided a bursting disc assembly comprising a bursting disc having an inlet face and an outlet face, and a support ring adapted to fit on the outlet face of the bursting disc (referred to as the "outlet ring" hereafter) and said outlet ring has a fluid flow passage through it from its radial interior to its radial exterior, wherein the fluid passage is a full thickness slot or a groove.

A preferred embodiment of the present invention also comprises a support ring designed to fit on the inlet face of the bursting disc (referred to as "inlet ring" hereafter). The inlet ring has no fluid passage through it from its radial interior to its radial exterior. The bursting disc and one or both support rings may have complementary shapes to ensure that the support rings can be fitted only to the correct faces of the bursting disc.

Preferably at least the outlet ring is secured, e.g. by welding, to the outlet face of the bursting disc. More preferably both the outlet and inlet rings are secured, e.g. by welding, to the outlet and inlet faces of the disc respectively.

It is preferable that at least one of the support rings has sufficient outer dimensions, e.g. diameter such that it provides precise location of the assembly in its mounted state by contact with one or more elements by the mounting, e.g. by centralisation between the flange bolts, ensuring for example that the operating region of the disc is coaxial with the flanges and pipe into which it is installed.

The support rings can be mounted coaxially with the bursting disc during installation. In a preferred embodiment, one or both of the inlet and outlet support rings are secured coaxially on the respective faces of the bursting disc before installation, to form a bursting disc assembly. In a further preferred embodiment, the bursting disc assembly also comprises seals, e.g. flat gaskets, adhered to the outside faces of the support rings to provide an improved seal when the assembly is clamped between flanges.

When the above assembly is installed, e.g. between flanges and correctly oriented, the outlet ring is on the downstream side of the bursting disc. The downstream face of a bursting disc is typically open to atmospheric pressure, either directly or via a tank for collecting discharged fluid when the bursting disc ruptures. When the disc is correctly installed, the pressure inside and outside the pipe on the downstream side is the same and there is no net flow through the fluid passage of the outlet ring.

When the assembly is installed and oriented incorrectly, the outlet ring will be on the pressurised (upstream) side of the bursting disc. As part of the normal start-up procedure of a process apparatus after engineering work (such as installation of a new bursting disc), a pressure test is commonly undertaken. In the event that the assembly is oriented incorrectly, the fluid passage of the outlet ring provides a means by which the pressurised fluid upstream of the bursting disc vents to atmosphere. This reduction in pressure will cause the maintenance staff to undertake a check of the vessel and associated equipment. The jet of fluid will be discovered, allowing the incorrect orientation of the bursting disc to be identified.

The bursting disc in the present invention may be either forward or reverse acting and can be constructed in accordance with normal production processes. The bursting disc may be solid metal (one-piece) or composite, and it may be un-scored, cross-scored or peripherally scored.

The fluid passage of the outlet ring may take the form of a groove or a full thickness slot. The fluid passage may also take the form of a bore. If the passage takes the form of a groove or slot, it should be of sufficient depth and width such that it will not be blocked by a gasket used in clamping the disc assembly between flanges. Typically its depth will be between 0.5 mm and 4.0 mm and its width will be between 0.5 mm and 4.0 mm. If the passage is a groove, it may be cut along either face of the outlet ring.

There may be some very small natural leakage of gas between the bursting disc-support ring seals and/or the support ring-gasket seals. Typically, this leakage may be $1 \times 10^{-3}$ $cm^3 s^{-1}$ or lower at a pressure differential of 1 Bar ($10^5$ Pa). The fluid passage in the present invention is typically such that the flow rate through it when the system is pressurised (for example at 1 Bar) on incorrect installation of the bursting disc is at least one hundred times the natural leakage rate, e.g. 0.1 $cm^3 s^{-1}$. The passage is designed to leak at a rate large enough such that it is conspicuous and easily noticed. The device of the invention may be used with gas or liquid as the pressurized fluid, but the preferred leak rate given here is for gas, such as air.

Bursting discs are typically made of stainless steel. Support rings are typically made of stainless steel. Gaskets are typically made of materials such as compressed fibre, PTFE or others. When clamped between gaskets, the bursting disc and support rings should mould together sufficiently such that fluid leakage through the metal-metal seal is not significant compared with fluid flow through the gas passage in the case of incorrect orientation.

The fluid passage may be straight or may comprise a baffle, provided for example by at least one bend in the passage, typically two or three or more bends. This arrangement is useful when the bursting disc is specified to have a high burst pressure. Without a baffle, incorrect orientation of the bursting disc and support rings may result in a very rapid depressurisation of the vessel and a pronounced "jetting" effect as the process fluid exits the fluid passage. The addition of the baffle produces a more controlled venting. The design of the baffle should be such that the lateral deflection of the gas passage should be at least equivalent to the passage width, preferably two to four times the passage width.

The addition of the fluid passage to the outlet ring is a final preventative measure against incorrect installation. It is intended to be an additional counter-measure to the usual means such as illustrations in the user guide and marking the disc with "vent side". Previously, bursting disc manufacturers have relied upon keying the fit of the disc to the holder, which is unavailable when mounting a bursting disc assembly between standard flanges.

The components of the bursting disc assembly of the invention may be provided, e.g. packaged, as a kit of parts, ready for assembly.

DRAWINGS

Further explanation of the invention, and embodiments of it, will now be described by way of non-limitative example, with reference to the accompanying drawings, in which.

EMBODIMENTS OF THE INVENTION

Figure 1:
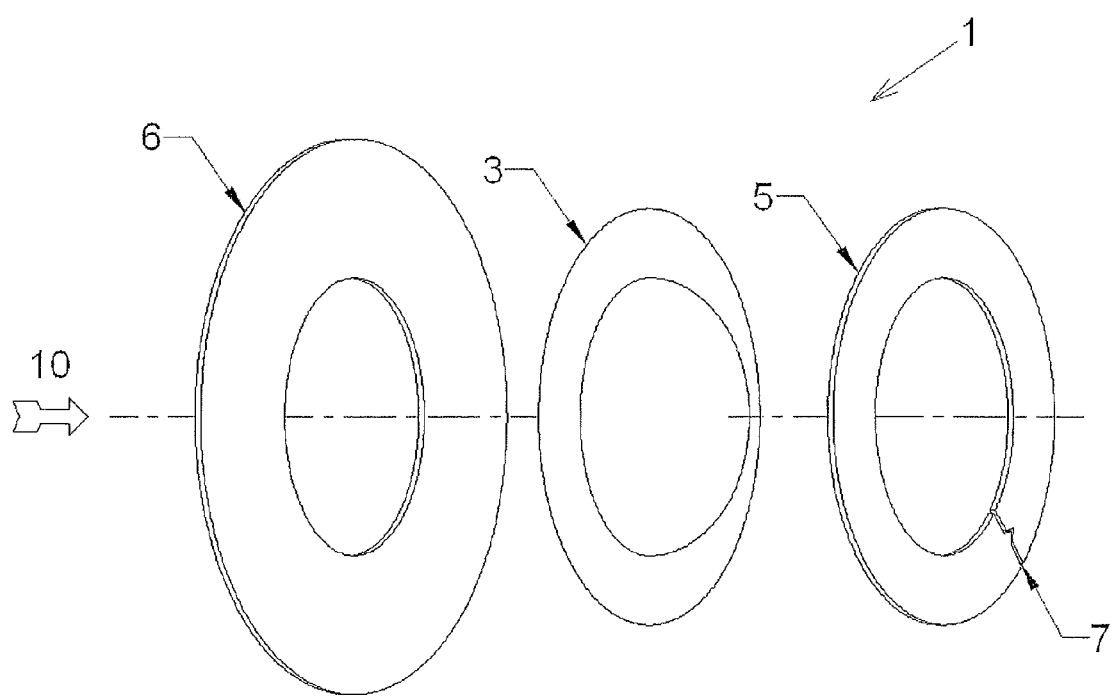
FIG. 1 is an exploded view of a correctly oriented forward-acting bursting disc assembly embodying the invention.

FIG. 1 shows an exploded view of a correctly oriented forward-acting bursting disc assembly 1 that embodies the present invention. A forward-acting bursting disc 3 is coaxially mounted on an inlet support ring 6 and an outlet support ring 5 and is correctly oriented with respect to an applied pressure 10. The outlet ring 5 is a flat ring of sheet material and has a radial slot 7 through it having a baffle in the form of a kink 9 described below. Because the outlet ring 5 is on the downstream side of the bursting disc when the assembly is mounted, pressurised fluid cannot escape through the slot 7. If the assembly is oriented in the incorrect reverse direction, outlet ring 5 is on the upstream side of the bursting disc. Pressurised fluid is able to flow through the slot 7 from the interior of the ring to its exterior and vent to atmosphere. In a pressure test, this reduction in pressure will cause the maintenance staff to undertake a check of the vessel and associated equipment. The cause of the venting will be located, allowing the incorrect orientation of the bursting disc to be identified.

Figure 2:
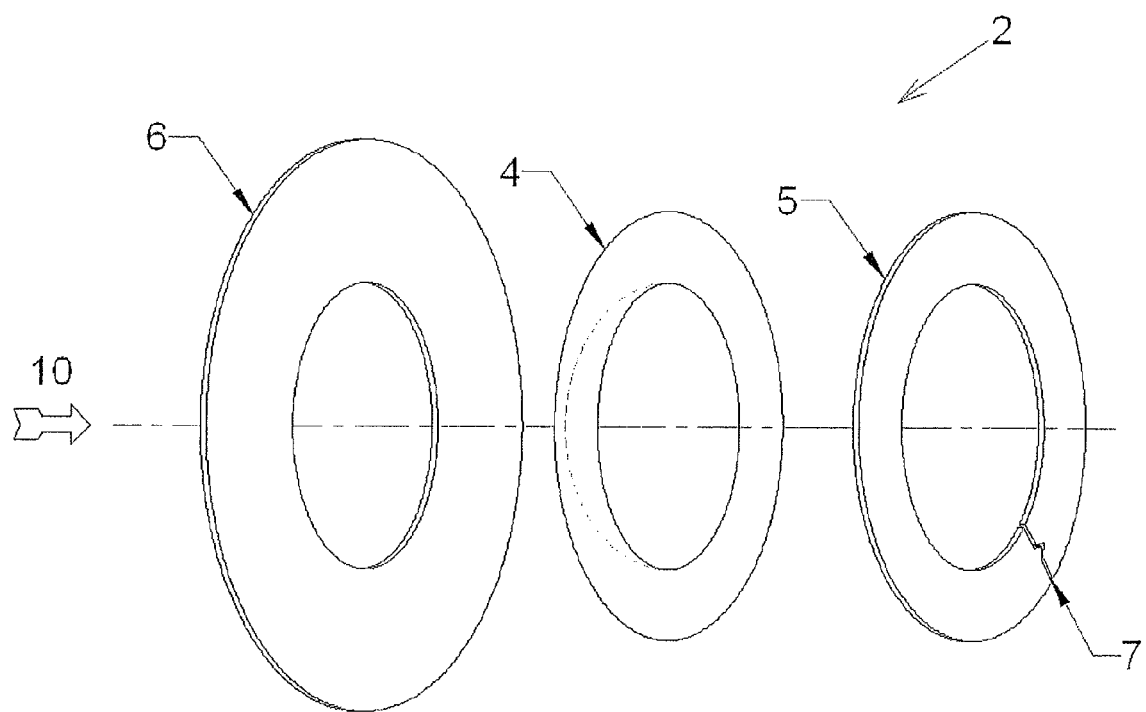
FIG. 2 is an exploded view of a correctly oriented reverse-acting bursting disc assembly embodying the invention.

FIG. 2 shows an exploded view of a correctly oriented reverse-acting bursting disc assembly 2 that embodies the present invention. A reverse-acting bursting disc 4 is coaxially mounted on an inlet ring 6 and an outlet ring 5 and is correctly oriented with respect to an applied pressure 10. The outlet ring 5 is a flat ring of sheet material and has a radial slot 7 through it, also having a kink 9 as described below. Because the outlet ring 5 is on the downstream side of the bursting disc, the pressurised fluid cannot escape through the slot 7. As with the assembly of FIG. 1, if the assembly is oriented in the wrong direction, the outlet ring 5 will be on the upstream side of the bursting disc. Pressurised fluid will be able to flow through the slot 7 from the interior of the ring 5 to its exterior and vent to atmosphere.

Figure 3B:
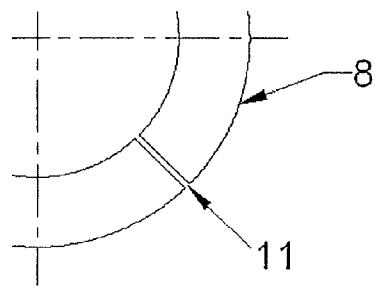
FIGS. 3a and 3b are close-up axial views of portions of outlet rings useful in the invention
Figure 3A:
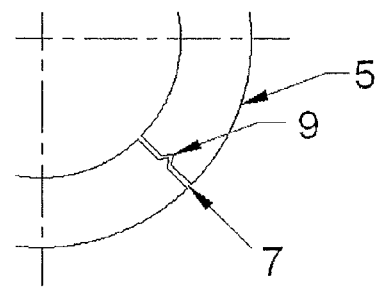

FIG. 3a is an axial view of a portion of the outlet ring 5 of FIGS. 1 and 2 having the radial slot 7 from its radial interior to its radial exterior. The radial slot 7 is a full thickness slot or gap in the ring 5, but alternatively a partial thickness groove may provide the fluid passage. The slot 7 has intermediate its ends a kink 9 providing three bends and acting as a baffle to restrict the flow rate of gas along the slot 7. FIG. 3b is an axial view of a modified outlet ring 9 with a straight radial slot 11 from its interior to its exterior. The baffle 9 in FIG. 3a produces a more controlled venting in the case of high pressure venting through the slot 7.

Figure 4:
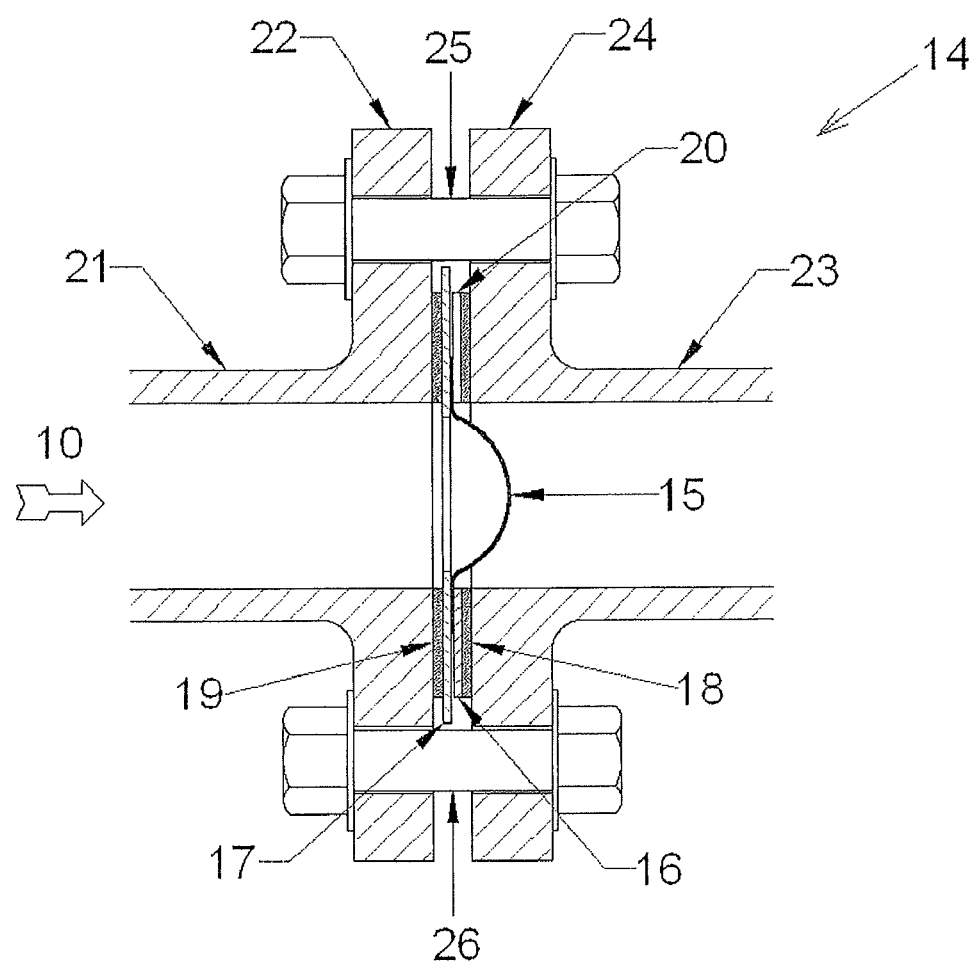
FIG. 4 is a side cross-sectional view of a pre-assembled embodiment of the invention, installed in a pipe.

FIG. 4 shows an embodiment of the present invention in which the bursting disc assembly is mounted in a pipe structure. A bursting disc assembly 14 is assembled between flange portions 22, 24 of pipes 21, 23 respectively. The assembly 14 comprises a forward-acting bursting disc 15, mounted between an outlet ring 16 and an inlet ring 17, the outlet ring having a radial slot 20 from its interior to its exterior, and gaskets 18 and 19 mounted on the outer faces of outlet ring 16 and inlet ring 17 respectively. Flange bolts 25 and 26 compress the assembly in an axial direction effecting seals between the components of the assembly. In FIG. 4 the assembly is correctly oriented with respect to an applied pressure 10. Provided that the applied pressure 10 is less than the rupture pressure of the bursting disc 15, the fluid is prevented from escaping from the pipe 21. If the assembly 14 is incorrectly oriented, the outlet ring 16 will be upstream on the pressure side. In this case, slot 20 will allow fluid to vent to atmosphere.

The assembly 14, of at least the bursting disc and the two rings 16, 17, may be pre-assembled in a factory or may be assembled during installation. If pre-assembled, the two rings 16, 17 are secured by welding to the disc 15, to ensure that the outlet ring 16 is fixed to the outlet side of the disc.

In a modification, the function of the support ring and the adjacent gasket on each side may be provided by a single component.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

I claim:

1. A bursting disc assembly comprising:
   a bursting disc adapted to rupture at a predetermined pressure differential, the bursting disc having an inlet face and an outlet face, and an outlet side support ring adapted to fit on the outlet face of the bursting disc, having a first face to oppose said outlet face of the bursting disc and a second face on its opposite side from said first face, said outlet side support ring having a fluid passage through it from its radial interior to its radial exterior, wherein said fluid passage is selected from a full thickness slot from said first face to said second face and a groove in one of said first and second faces, wherein when said first face of the outlet side support ring is pressed in its assembled state against said outlet face of the bursting disc, said fluid passage provides a fluid flow path located within a thickness of said outlet side support ring and extending from the outlet side of the bursting disc to the radial exterior of said outlet side support ring.

2. A bursting disc assembly according to claim 1, additionally comprising an inlet side support ring adapted to fit on the inlet face of the bursting disc.

3. A bursting disc assembly according to claim 1, wherein said outlet side support ring is secured to the outlet face of the bursting disc.

4. A bursting disc assembly according to claim 1, wherein said disc and said outlet side support ring have complementary shapes to ensure that they are correctly fitted together.

5. A bursting disc assembly according to claim 1, wherein said outlet side support ring is a flat ring of sheet material.

6. A bursting disc assembly according to claim 1, wherein said fluid passage has a baffle in the form of at least one bend restraining gas flow.

7. An assembly comprising:

a vessel which is pressurised in use, and a bursting disc assembly mounted in an outlet of said vessel, said bursting disc assembly comprising a bursting disc adapted to rupture at a predetermined pressure differential, the bursting disc having an inlet face and an outlet face, and a support ring supporting the outlet face of the bursting disc, having a first face to oppose said outlet face of the bursting disc and a second face on its opposite side from said first face, said support ring having a fluid passage through it from its radial interior to its radial exterior, wherein said fluid passage is selected from a full thickness slot from said first face to said second face and a groove in one of said first and second faces, and wherein when said first face of the outlet side support ring is pressed in its assembled state against said outlet face of the bursting disc, said fluid passage provides a fluid flow path located within a thickness of said outlet side support ring and extending from the outlet side of the bursting disc to the radial exterior of said outlet side support ring.

8. An assembly according to claim 7, wherein said bursting disc assembly additionally comprises another support ring supporting the inlet face of the bursting disc.

9. An assembly according to claim 8, wherein said another support ring is secured to the inlet face of the bursting disc.

10. An assembly according to claim 8, wherein said bursting disc and said another support ring have complementary shapes to ensure that they are correctly fitted together.

11. An assembly according to claim 7, wherein said support ring is secured to the outlet face of the bursting disc.

12. An assembly according to claim 7, wherein said bursting disc and said support ring have complementary shapes to ensure that they are correctly fitted together.

13. An assembly according to claim 7, wherein said support ring is a flat ring of sheet material.

14. An assembly according to claim 7, wherein said fluid passage has a baffle in the form of at least one bend restraining gas flow.

15. An assembly according to claim 7, wherein said inlet face of the bursting disc is subjected to the pressure in said vessel.

* * * * *